US011750321B2

(12) United States Patent
Yoffe et al.

(10) Patent No.: US 11,750,321 B2
(45) Date of Patent: Sep. 5, 2023

(54) PEAK RATE ENHANCEMENT FOR CONSTELLATION SHAPING

(71) Applicant: Intel Corporation, Santa Clara, CA (US)

(72) Inventors: Yaron Yoffe, Rishon LeTsiyon (IL); Assaf Gurevitz, Ramat Hasharon (IL); Elad Meir, Ramat Gan (IL); Shlomi Vituri, Tel Aviv (IL); Qinghua Li, San Ramon, CA (US); Feng Jiang, Santa Clara, CA (US); Xiaogang Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 17/110,611

(22) Filed: Dec. 3, 2020

(65) Prior Publication Data
US 2021/0091886 A1     Mar. 25, 2021

Related U.S. Application Data

(60) Provisional application No. 62/942,944, filed on Dec. 3, 2019.

(51) Int. Cl.
*H04L 1/00*     (2006.01)
*H04L 27/04*    (2006.01)

(52) U.S. Cl.
CPC .......... *H04L 1/0042* (2013.01); *H04L 1/0061* (2013.01); *H04L 27/04* (2013.01)

(58) Field of Classification Search
CPC ... H04L 1/0041; H04L 1/0042; H04L 1/0057; H04L 1/0064; H04L 1/0061; H04L 1/0063; H04L 1/0065; H04L 27/3411; H04L 27/04; H04L 27/2602; H04L 1/0058;
(Continued)

(56) References Cited

U.S. PATENT DOCUMENTS 10,091,046 B1 * 10/2018 Lefevre .................. H04L 27/36
10,742,472 B1 *  8/2020 Van Nee ................ H04L 27/36
(Continued)

OTHER PUBLICATIONS

G. Böcherer et al., "Bandwidth Efficient and Rate-Matched Low-Density Parity-Check Coded Modulation," IEEE Transactions on Communications, vol. 63, No. 12, pp. 4651-4665, Dec. 2015. doi: 10.1109/TCOMM.2015.2494016.

*Primary Examiner* — Khanh C Tran
(74) *Attorney, Agent, or Firm* — Eversheds Sutherland (US) LLP

(57) ABSTRACT

This disclosure describes systems, methods, and devices related to enhanced constellation shaping. A device may generate payload bits associated with a frame, wherein the payload bits comprise a first portion and a second portion. The device may send the first portion of the payload bits through a shaping encoder. The device may generate shaped bits from the shaping encoder. The device may determine a number of amplitude bits based on the shaped bits. The device may generate parity bits from the shaped bits and the second portion going through an low-density parity-check (LDPC) encoder. The device may select sign bits comprising the second portion and a first subset of the parity bits. The device may send the amplitude bits with the sign bits to a modulator before transmitting the frame to a first station device.

18 Claims, 13 Drawing Sheets

(58) Field of Classification Search
CPC ... H04L 27/36; H04L 25/03834; H04L 1/009; H04L 25/03343; H04L 2027/0083
See application file for complete search history.

(56) References Cited

U.S. PATENT DOCUMENTS

| | | | | |
|---|---|---|---|---|
| 2009/0138785 | A1* | 5/2009 | Sakai | H03M 13/1111 |
| | | | | 714/790 |
| 2010/0054223 | A1* | 3/2010 | Zhang | H04W 16/28 |
| | | | | 370/338 |
| 2018/0367246 | A1* | 12/2018 | Kakande | G06N 7/01 |

* cited by examiner

PEAK RATE ENHANCEMENT FOR CONSTELLATION SHAPING

CROSS-REFERENCE TO RELATED APPLICATION(S)

This application claims the benefit of U.S. Provisional Application No. 62/942,944, filed Dec. 3, 2019, the disclosure of which is incorporated herein by reference as if set forth in full.

TECHNICAL FIELD

This disclosure generally relates to systems and methods for wireless communications and, more particularly, to enhanced constellation shaping.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
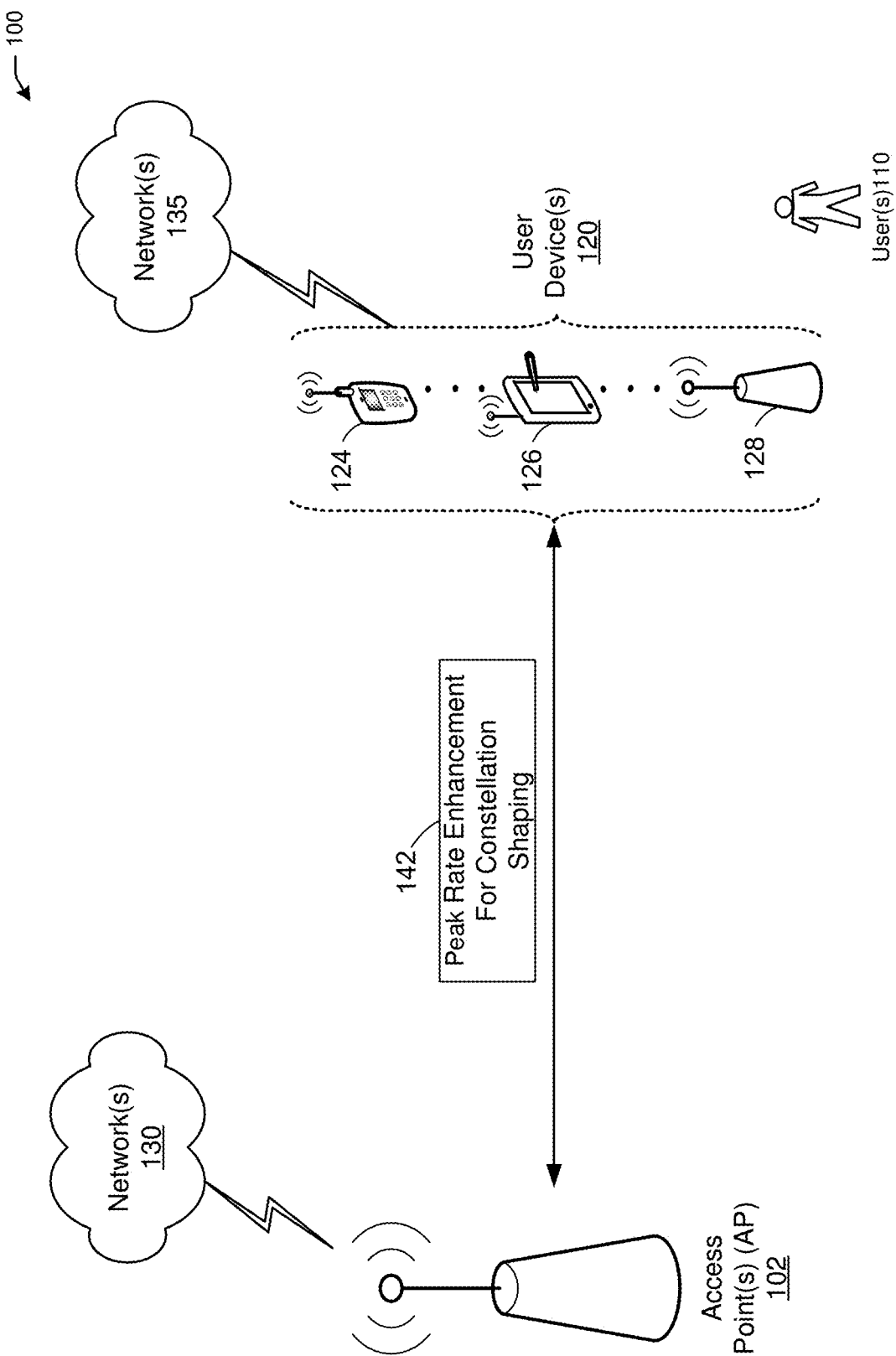
FIG. 1 is a network diagram illustrating an example network environment for enhanced constellation shaping, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Recently, we proposed a new constellation shaping (CS) technique to improve the efficiency and throughput of wireless communication systems. The proposed method modifies the probabilities of the constellation points, making it more similar to Gaussian distribution. Thus, a shaping gain of up to 1.53 dB can be achieved. The mechanisms described in this disclosure could be incorporated into the next Wi-Fi $7^{th}$ generation standard named EHT (Extremely high throughput).

In the proposed scheme, the transmitting device may apply a shaping encoder over input information bit sequence (payload bits) in order to manipulate the probabilities of each constellation point. This procedure adds redundancy to the information bit sequence, therefore, reduces the peak data rate.

The peak data rate is limited by the ratio of amplitude bits to sign bits of the given constellation e.g., 4K quadrature amplitude modulation (QAM). The amplitude bits specify the amplitudes in the 4 k QAM mapping. For example, there are 10 amplitude bits and 2 sign bits for the mapping of 4K QAM. In the conventional constellation shaping (CS) schemes, the amplitude bits are shaped bits and the sign bits are parity bits. Furthermore, the amplitudes bits are the systematic bits of a channel codeword like low-density parity-check (LDPC) and the sign bits are the parity bits of the channel codeword. Therefore, the ratio of the systematic bits to the parity bits has to be the same as the ratio of the amplitude bits to the sign bits. This sets an undesirable constrain since there is a need to support multiple code rates (e.g., MAC protocol data unit (MPDU) code rate, physical layer (PHY) protocol data unit (PPDU) code rate, LDPC code rate) for each QAM. For example, it is not feasible for the conventional constellation shaping to achieve 5/6 effective code rate with 4K QAM because the shaping encoder always has a code rate less than 1.

In this contribution, a modified CS scheme is presented that can achieve effective code rates higher than the conventional CS.

It has been suggested to increase the throughput by transmitting bits that did not pass the LDPC encoder. The shortcoming of this scheme that it is more sensitive to errors, and it is not robust to fading channels.

Example embodiments of the present disclosure relate to systems, methods, and devices for enhanced constellation shaping.

In one or more embodiments, an enhanced constellation shaping system may facilitate receiving payload bits that are to be sent from a transmitting device to a receiving device. The payload bits comprise information that is to be communicated between the transmitting device and the receiving device. The payload bits may be comprised of ones and zeros that will pass through an encoding step before being modulated to be transmitted in the air to the receiving device.

In one or more embodiments, an enhanced constellation shaping system may pass the payload bits through a shaping encoder in order to modify the variable bit sequence of the payload bits into a fixed sequence of shaped bits after going through the shaping encoder. For example, a payload bits sequence of four bits of '0' may be shaped by the shaping encoder to be represented by five bits, which means that the sequence increased by one bit. However, a payload bits sequence of nine bits of '1' may be shaped by the shaping encoder to be represented by five bits, which means that the sequence decreased by four bits. Therefore, the data rate fluctuates based on the number of bits that come out of the shaping encoder and the LDP see encoder. For example additional bits because a low data rate because more bits are now transmitted but less bits being transmitted results in a higher data rate. Therefore it is desirable to lower the data rate by minimizing the impact of the shaping encoder by lowering the number of output bits.

In one or more embodiments, two techniques may be used to increase the effective code rate. The first one is to convert a portion of the uniformly distributed systematic bits into uniformly distributed bits that are used as the sign bits. As a result, the sign bits can carry part of the systematic bits in addition to the parity bits. The second technique is to set aside a portion of the information bits such that these bits are not encoded by the shaping encoder but they are still encoded by the LDPC encoder (or any other type of encoder). Further, scrambling of the shaped bits may occur either before the LDPC encoding or after the LDPC encoding. In one or more embodiments, the parity bits may be generated from the payload bits where part of the payload bits can be scrambled while another part is not scrambled.

Since these bits are not encoded by the shaping encoder that reduces the output bits, hence, the overall effective code rate is increased. The two techniques may be applied individually or jointly. Although an LDPC encoder is contemplated, it should be understood that the LDPC encoder can be replaced by any channel encoder, e.g., any linear block code or trellis code like Turbo code.

The advantage is straight-forward. Using the proposed schemes, the highest data rate of CS can be increased to meet the requirements of EHT. The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of enhanced constellation shaping, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
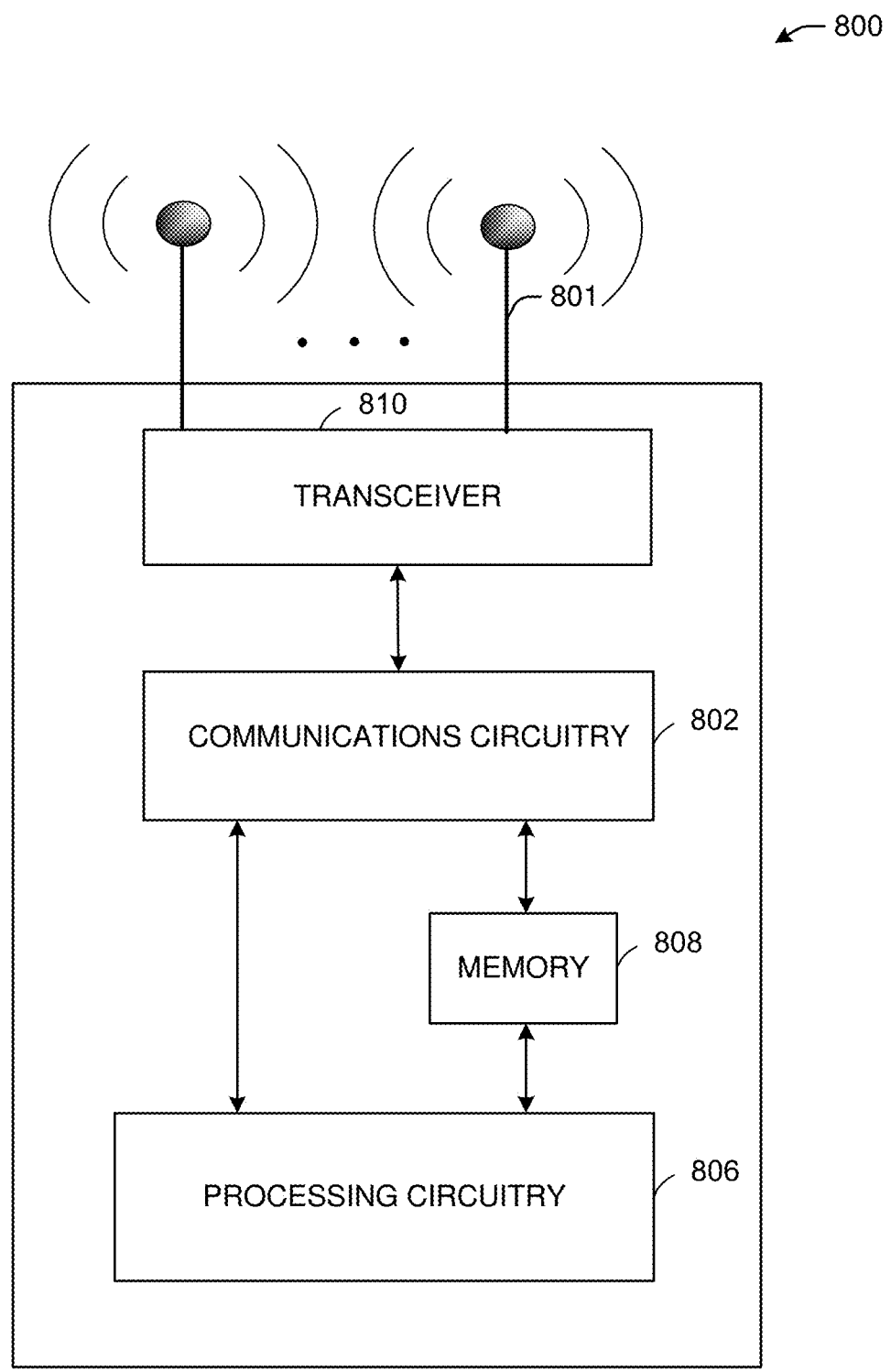
FIG. 8 illustrates a functional diagram of an exemplary communication station that may be suitable for use as a user device, in accordance with one or more example embodiments of the present disclosure.
Figure 9:
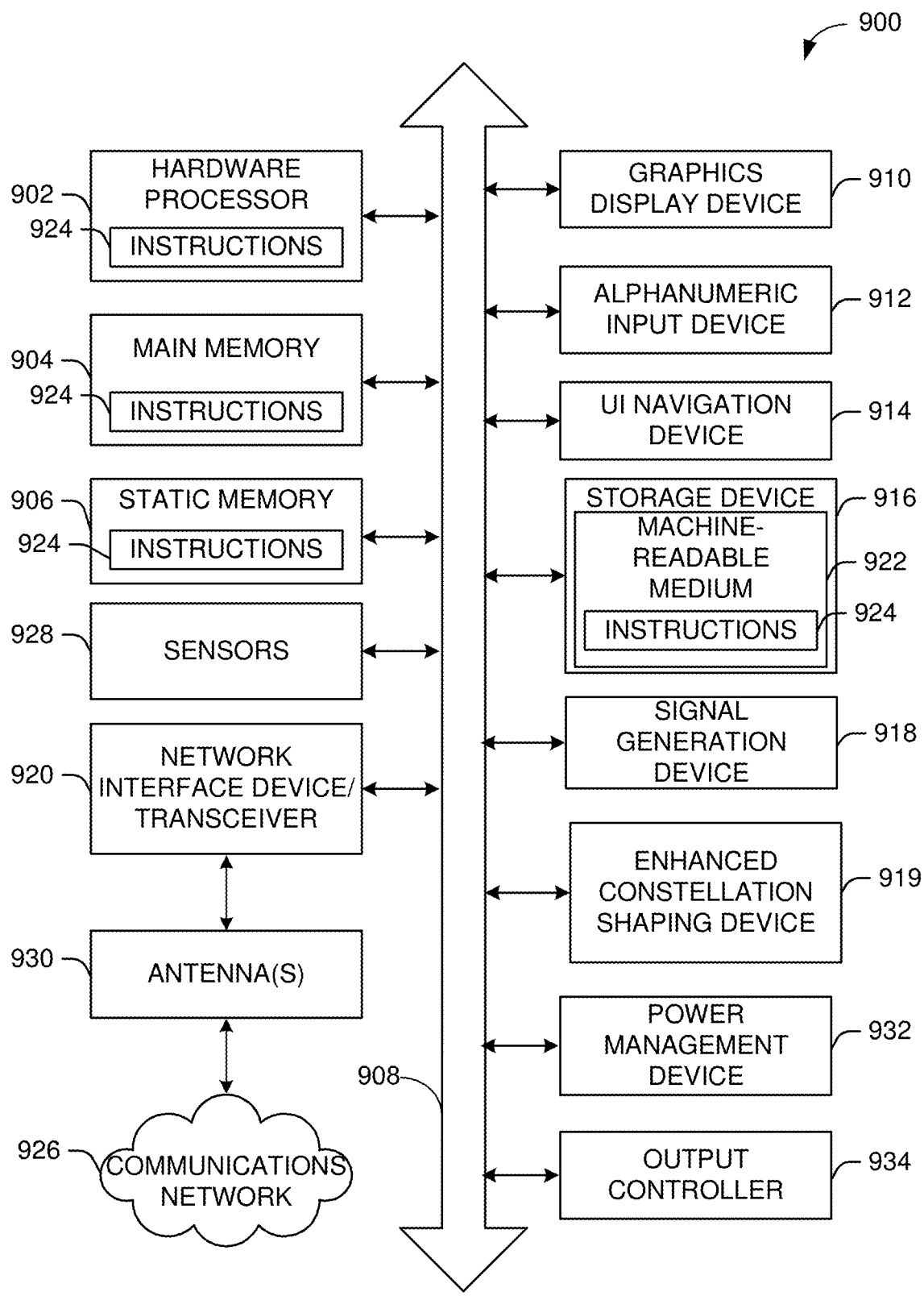
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.1 lay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may facilitate enhanced constellation shaping 142 with one or more user devices 120.

The enhanced constellation shaping 142 may facilitate receiving payload bits that are to be sent from a transmitting device to a receiving device. The payload bits comprise information that is to be communicated between the transmitting device and the receiving device. The payload bits may be comprised of ones and zeros that will pass through an encoding step before being modulated to be transmitted in the air to the receiving device.

The enhanced constellation shaping 142 may pass the payload bits through a shaping encoder in order to modify the variable bit sequence of the payload bits into a fixed sequence of shaped bits after going through the shaping encoder. For example, a payload bits sequence of four bits of '0' may be shaped by the shaping encoder to be represented by five bits, which means that the sequence increased by one bit. However, a payload bits sequence of nine bits of '1' may be shaped by the shaping encoder to be represented by five bits, which means that the sequence decreased by four bits. Therefore, the data rate fluctuates based on the number of bits that come out of the shaping encoder and the LDP see encoder. For example additional bits because a low data rate because more bits are now transmitted but less bits being transmitted results in a higher data rate. Therefore it is desirable to lower the data rate by minimizing the impact of the shaping encoder by lowering the number of output bits.

The enhanced constellation shaping 142 may facilitate two techniques may be used to increase the effective code rate. The first one is to convert a portion of the uniformly distributed systematic bits into uniformly distributed bits that are used as the sign bits. As a result, the sign bits can carry part of the systematic bits in addition to the parity bits. The second technique is to set aside a portion of the information bits such that these bits are not encoded by the shaping encoder but they are still encoded by the LDPC encoder. Since these bits are not encoded by the shaping encoder that reduces the output bits, hence, the overall effective code rate is increased. The two techniques may be applied individually or jointly. Although an LDPC encoder is contemplated, it should be understood that the LDPC encoder can be replaced by any channel encoder, e.g., any linear block code or trellis code like Turbo code.

It is understood that the above descriptions are for purposes of illustration and are not meant to be limiting.

Figure 2:
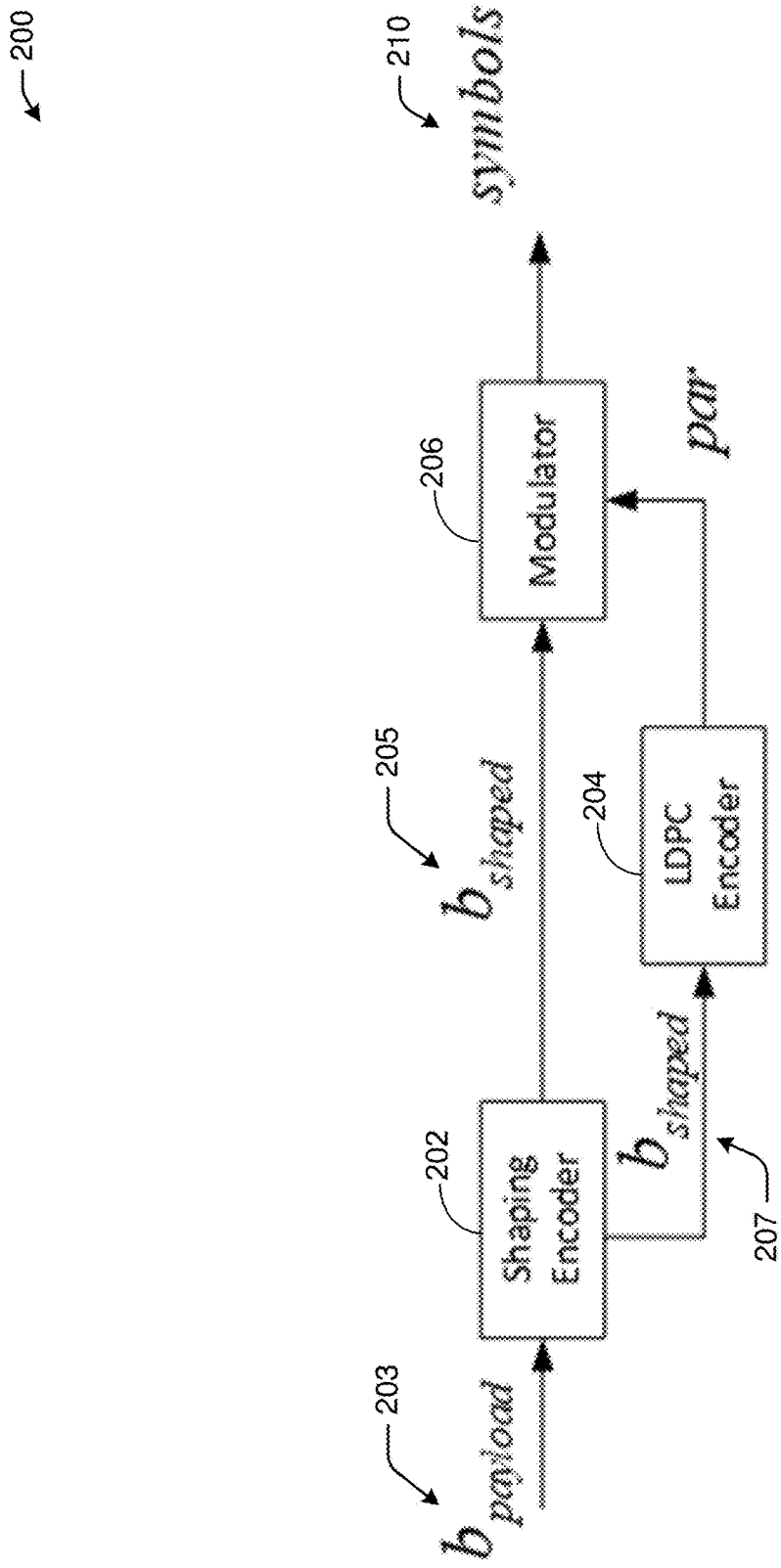
FIG. 2 depicts an illustrative schematic diagram for enhanced constellation shaping, in accordance with one or more example embodiments of the present disclosure.

FIG. 2 depicts an illustrative schematic diagram 200 for enhanced constellation shaping, in accordance with one or more example embodiments of the present disclosure.

Referring to FIG. 2, there is shown a constellation shaping (CS) scheme. The scheme starts by transforming independent and identically-distributed (i.i.d.) bits streams (e.g., payload bits) into shaped bits. The shaped bits represent consecutive amplitudes, i.e. pulse-amplitude-modulation (PAM) symbols without the sign bits. The purpose of the shaping encoder is to modify the probability of each amplitude according to pre-defined values that are optimized in advance. The shaped bits are then encoded using the low-density parity-check (LDPC) encoder, and parity bits are generated. The parity bits, which are equiprobable (even though the input may not be), are then used as sign bits at the modulator, which maps the amplitude and sign bits to the QAM constellation.

QAM stands for quadrature amplitude modulation, the format by which digital cable channels are encoded and transmitted. QAM is used in a variety of communications systems such as WiFi. In a QAM signal, there are two carriers, each having the same frequency but differing in phase by 90 degrees (one quarter of a cycle, from which the term quadrature arises). One signal is called the I signal, and the other is called the Q signal. Mathematically, one of the signals can be represented by a sine wave, and the other by a cosine wave. The two modulated carriers are combined at the source for transmission. At the destination, the carriers are separated, the data is extracted from each, and then the data is combined into the original modulating information. That is QAM is a form of modulation that is a combination of phase modulation and amplitude modulation. The QAM scheme represents bits as points in a quadrant grid know as a constellation map. A constellation is a graph of the phase and amplitude modulation points in a given modulation scheme. Bits first go through a QAM modulator. Then the modulated signal is grouped into successive blocks of a certain size. Then each block is transmitted to a receiving device.

Referring to FIG. 2, there is shown payload bits 203 that are used as input to a shaping encoder 202. The output of the shaping encoder 202 may result in shaped bits 205. The shaped bits represent only the amplitudes of QAM symbol (without sign bit). The shaped bits 205 may then pass through an LDPC encoder 204 in one branch before getting to the modulation step at the modulator 206, while a second branch of the shaped bits 205 passed through directly to the modulator 206.

The LDPC encoder 204 generates uniformly distributed parity bits that are used as the sign bits. That is, the LDPC encoder 204 controls the sign of the bits (e.g., '+1' or '−1'). The modulator 206 may change the input bits, which are the shaped bits 205 to a set of amplitudes for quadrature amplitude modulation (QAM) constellation and the sign is controlled by the LDP see encoder 204. The result is a number of symbols 210 that are used for the transmission from the transmitting device to the receiving device.

In one or more embodiments, the shaping encoder transforms uniformly distributed bits sequence (e.g., payload bits 203) into amplitudes (positive values only), which are used by the Gray mapping in the symbol mapping using a mapping table (e.g., Table 1 below). Basically, the shaping encoder 202 is a mapping table, which describes a prefix code.

In one or more embodiments, each amplitude at the output of the shaping encoder 202 has a corresponding input bit sequence at the input of the shaping encoder, where the length of the input bit sequence may vary. For example, the input bits representing payload bits 203 may be any sequence of zeros and ones, which may have a variable length. The mapping table is constructed in such a way that the probabilities of the amplitudes will approximate some desired distribution, which are optimized in advance, which results in a fixed length for each entry in the mapping table. The matching between a specific bit sequence and an amplitude (or an output sequence) is done by calculating the probability to get the specific bit sequence. Since the probability to get a bit sequence is always dyadic, i.e. can be written as $2^{-k}$ where k is integer, the block can only emulate dyadic probabilities.

The following is a short and simple example:

Consider the probabilities set [½, ¼, ⅛, ⅛]. The appropriate mapping table would be as shown in Table 1. If a random bit sequence is observed, the probability that the first bit is '0' is 0.5, therefore '0' can be mapped into amplitude 1. Meaning that if '0' is observed as the first bit, this is mapped into amplitude 1 and continue to the next bits. Similarly, if '10' is received—amplitude 3 would be the output. This will occur with a probability 0.25 as desired. The completing bit sequences in this case would be '110' and '111', which are given the amplitudes 5 and 7 such that all amplitudes are used and the probabilities sum up to one, and have exactly probability of ⅛, respectively. The amplitudes are then mapped into output bits using Gray code mapping.

TABLE 1

Example for shaping encoder mapping table.

| Input | Index | Amplitude | Output bits | Prob. of sequence |
|---|---|---|---|---|
| 0 | 1 | 1 | 10 | 1/2 |
| 10 | 2 | 3 | 11 | 1/4 |
| 110 | 3 | 5 | 01 | 1/8 |
| 111 | 4 | 7 | 00 | 1/8 |

Example: $B_{in}$=(0 10 0 111 0 0 110)→amplitude=(1 3 1 7 1 1 5)→$B_{out}$=(10 11 10 00 10 10 01).

The overall rate of the transmission scheme is given by:

$$R = R_{shaping} \cdot R_{LDPC} \cdot M, \quad (1)$$

where M is the number of bits per QAM symbol; and $R_{shaping}$ and $R_{LDPC}$ are the rates of the shaping encoder and LPDC encoder, respectively.

For example, CS-MCS12 is based on 4K QAM (M=12), $R_{shaping}$=0.908 and $R_{LDPC}$=5/6. The resulting rate if 9.08 [bits/coded symbol].

One disadvantage of the previously proposed CS scheme is that it cannot achieve the highest potential rate of MCS13, given by $R_{LDPC}^{(max)} \cdot M^{max}$=5/6*12=10, where $R_{LDPC}^{(max)}$=5/6 and $M^{max}$=12 are the highest parameters supported by the standard. This is because encoding a uniformly distributed bits sequence into a shaped sequence can be done only with adding redundancy bits, which implies that shaping encoder's rate is smaller than 1.

Figure 3:
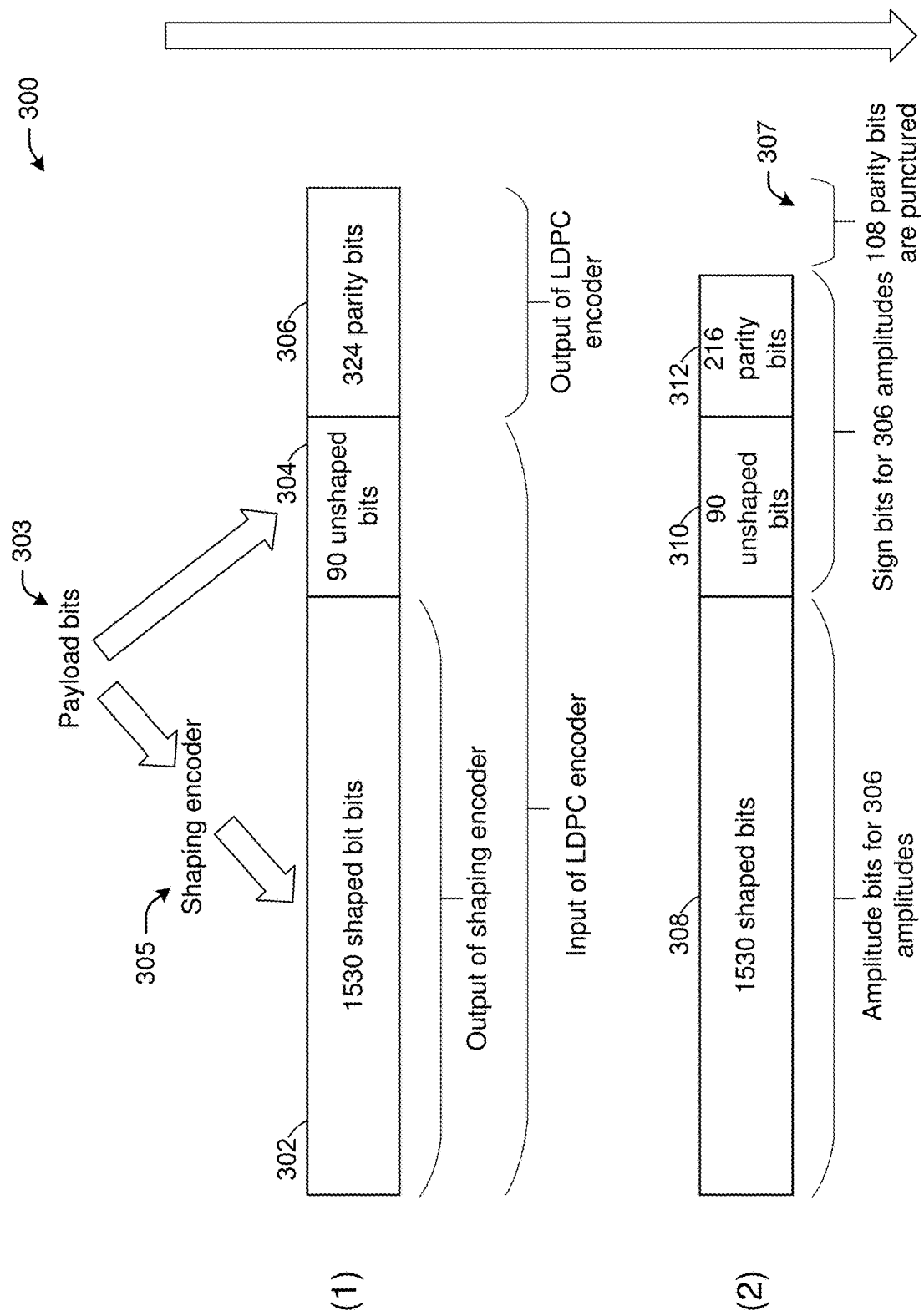
FIG. 3 depicts an illustrative schematic diagram for enhanced constellation shaping, in accordance with one or more example embodiments of the present disclosure.

FIG. 3 depicts an illustrative schematic diagram 300 for enhanced constellation shaping, in accordance with one or more example embodiments of the present disclosure.

In this disclosure, two new CS schemes are suggested that can achieve the maximal throughput, while benefiting from the advantages of constellation shaping.

Method 1: Puncturing and Using Un-Shaped Bits:

In one or more embodiments, the code rate may be increased by puncturing some of the parity bits. As the punctured bits are not transmitted, the ratio of the number of information bits to the number of coded bits increases (and accordingly the code rate). The higher code rate is used by the channel encoder, the higher the effective code rate can be produced, e.g., the highest effective code rate of 10[bits/symbol] as required.

However, puncturing parity bits in CS scheme causes mismatch between the number of amplitudes and the number of parity bits. It is essential that the number of amplitudes (e.g., amplitude bits) and the number of parity bits would be equal, as the parity bits are used as sign bits for each amplitude.

In current LDPC infrastructure for large payloads, each LDPC codeword consists of 1944 bits, out of which 324 are parity bits for the highest code rate 5/6. Since 4K QAM is used in the highest data rates, the 1620 information bits represent exactly 324 amplitudes, and each amplitude has a corresponding parity bit for specifying the sign i.e. positive or negative on the I or Q axis in the constellation mapping.

In this proposal, this issue is solved by transmitting a small amount of unshaped bits (bits that did not pass the shaping encoder) in each LDPC codeword. Since the information bits are assumed uniformly distributed, it can be used as sign bits instead of the punctured parity bits.

Referring to FIG. 3, there is shown an example for method 1—puncturing and using unshaped bits. For example, payload bits 303 may be divided into a portion that is fed through a shaping encoder 305 and another portion that is not fed through the shaping encoder. In this example there is shown that 1530 shaped bits 302 resulted from the first portion being fed through the shaping encoder 305 and 90 unshaped bits 304, which represent the second portion not fed through the shaping encoder 305. Further, since in LDPC encoder is used (e.g., LDPC encoder 204 of FIG. 2), the LDPC encoder generates 324 parity bits. These parity bits are typically used for protection of the bits that are being transmitted from a transmitting device to a receiving device.

This example can be used to generate MCS-13. In this example, in each LDPC codeword 90 unshaped bits 304 are appended to 1530 shaped bits 302, yielding the required 1620 information (or systematic) bits. At the LDPC encoder, 324 parity bits are generated. Out of the 324 parity bits, only 216 are transmitted to the channel, and 108 are punctured (e.g., removed, or unused). The unshaped 90 bits 304, combined with the 216 parity bits 306 produces 306 equiprobable bits that can be used as sign bits. This matches to the 1530/5=306 amplitudes, generated by the shaping encoder. It should be understood that the denominator of 5 is for 4 kQAM specifically. It should be noticed that the 90 unshaped bits 304 are also protected by the 216 parity bits of the channel encoder, for example, the LDPC encoder though the 90 unshaped bits do not pass through the shaping encoder. The equivalent LDPC rate of this scheme is equal to:

$$R_{LDPC} = \frac{1620}{1620 + 216} = 0.88,$$

which can achieve a higher effective rate than the previously proposed methods. The rate of the scheme is equal to $$R = \frac{(1530 \cdot R_{shaping} + 90)}{1836} \cdot 12$$

It should be understood that "5" is for 4 kQAM specifically. It can be another number for another QAM. There are 2^5=32 amplitudes for 4 kQAM's real and imaginary axes, respectively, where 4 k=2^12 takes 12 bits per QAM. Out of the 12 bits, 5 bits are for the amplitude of real axis, 1 bit is for the sign of the real axis, 5 bits are for the amplitude of imaginary axis, and 1 bit is for the sign of the imaginary axis. Similarly, for 1 kQAM, there are 2—4=16 amplitudes for 1 kQAM's real and imaginary axes, respectively, where 1 k=2^10 takes 10 bits per QAM. Out of the 10 bits, 4 bits are for the amplitude of real axis, 1 bit is for the sign of the real axis, 4 bits are for the amplitude of imaginary axis, and 1 bit is for the sign of the imaginary axis. For 16 kQAM, the number is 6 instead of 5.

At the receiver, a standard procedure of using zero log-likelihood ratios (LLRs) for the punctured bits is used. For binary code, the hard decision is 1 when the a posteriori LLR is negative and is 0 when the a posteriori LLR is positive. The zero a posteriori LLR means that the probability of sending 0 and 1 is equal. As a consequence, the hard decision can be either 0 or 1 when the a posteriori LLR is zero.

Although the above example shows the use of an LDPC encoder, it should be understood that the LDPC encoder can be replaced by any channel encoder, e.g., any linear block code or trellis code like Turbo code.

It is understood that the above descriptions are for purposes of illustration and are not meant to be limiting.

Figure 4:
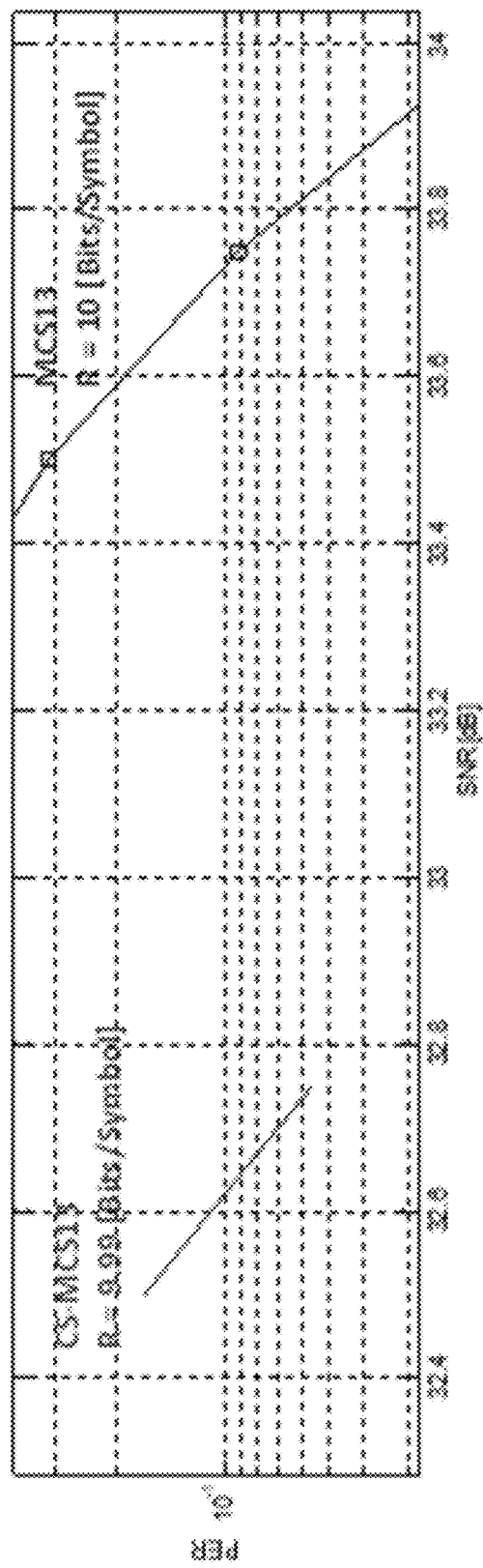
FIG. 4 depicts an illustrative schematic diagram packet error ratio (PER) results based on the enhanced constellation shaping, in accordance with one or more example embodiments of the present disclosure.

FIG. 4 depicts an illustrative schematic diagram 400 for packet error ratio (PER) results based on the enhanced constellation shaping, in accordance with one or more example embodiments of the present disclosure.

Referring to FIG. 4, there is shown packet error ratio (PER) results for Method 1.

The PER result of Method 1 is demonstrated in FIG. 4. Here there is shown about 1.1 dB gain compared to the standard scheme that doesn't use constellation shaping. The data rate differences between Method 1 and the standard scheme is negligible only ~0.1%.

Figure 5:
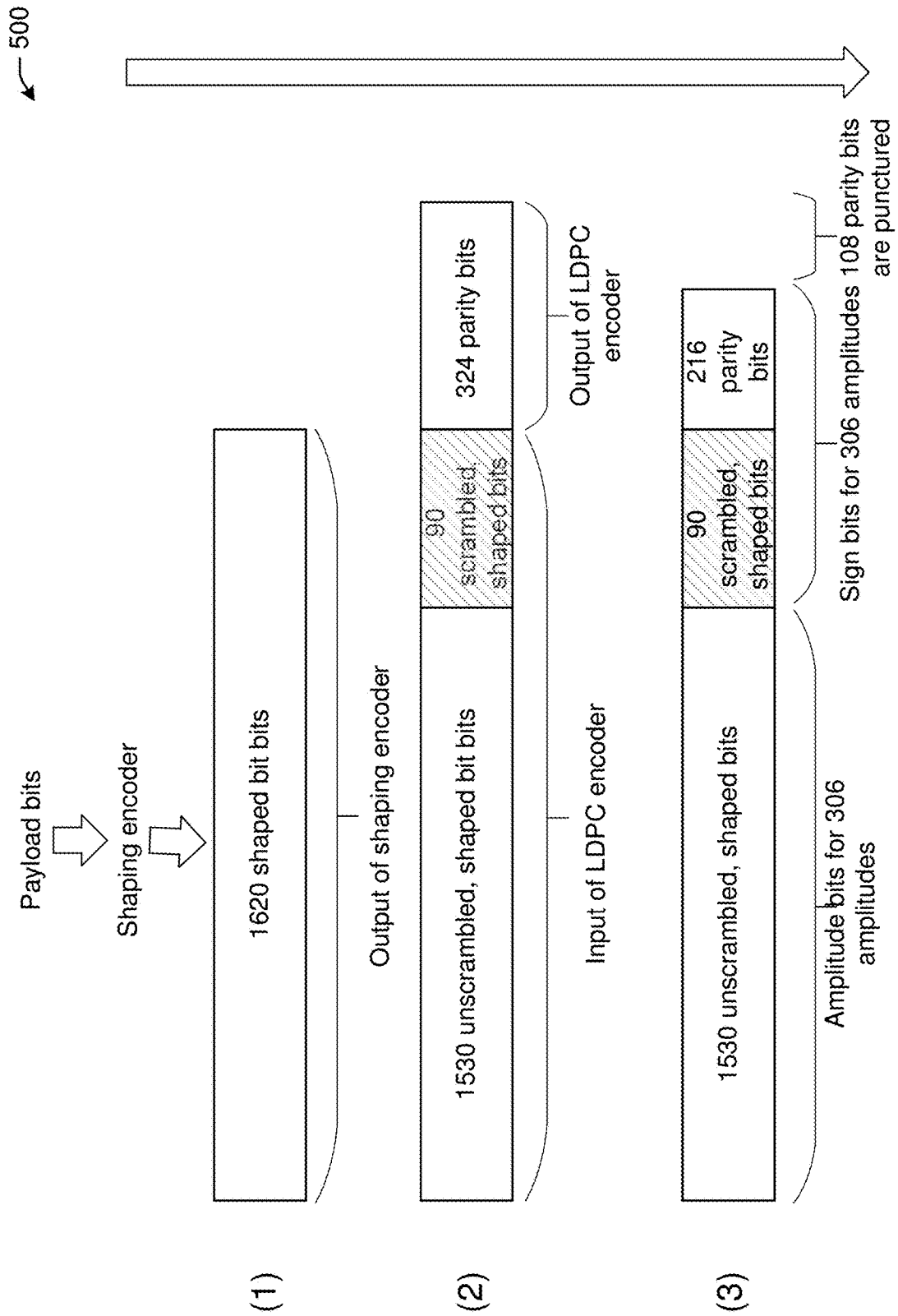
FIG. 5 depicts an illustrative schematic diagram for enhanced constellation shaping, in accordance with one or more example embodiments of the present disclosure.

FIG. 5 depicts an illustrative schematic diagram 500 for enhanced constellation shaping, in accordance with one or more example embodiments of the present disclosure.

Referring to FIG. 5, there is shown an example for Method 2—puncturing and scramble bits.

Method 2: Puncturing and Using Scrambled Bits:

This approach is very similar to the Method 1 with minor adjustment. Instead of using some of the unshaped bits as the sign bits, equiprobable sign bits are generated by scrambling or masking some of the shaped bits with a known mask. Equiprobable sign bits are equal probable bits of 1's and 0's. Thus, the same basic structure of the CS scheme can be reused, with only small modifications. Although this scheme is less efficient than Method 1, it has the benefit of using only one stream of bits, instead of separating the payload bits into two processing streams shaped and non-shaped.

At the receiving device, the same mask is used after the LPDC decoder and the scrambled bits are again transformed back to the original shaped bits.

An illustration is shown in FIG. 5. In this example, 90 bits out of the 1620 shaped bits are scrambled or masked using a known mask to produce the sign bits. The mask may be a sequence of bits with equiprobable 0s and 1s. The rate, in this case, is equal to:

$$R = R_{shaping} 1620/1836 \cdot 12. \quad (2)$$

It should understood that the 90 payload bits usually are scrambled such that the 1 and 0 are of equal probabilities, i.e., 0.5. The 216 parity bits, which remain after puncturing, are of equal probabilities for 1 and 0 because of the channel encoding, e.g., LDPC encoding. These two parts of bits are used as the sign bits for the QAM mapping. The total of the two is 306. For sign bits, it is desired to have equal probabilities for mapping the amplitudes to the positive side and negative side of the real and imaginary axes evenly.

In one or more embodiments, the parity bits may be generated from the payload bits where part of the payload bits can be scrambled while another part is not scrambled. In some scenarios, the amplitude bits may consist of some scrambled amplitude bits and generated parity bits. Further, it should be understood that the although the scrambling is shown in FIG. 5 to occur after going through the shaping encoder, the scrambling of can occur before the LDPC encoding or after the LDPC encoding.

It is understood that the above descriptions are for purposes of illustration and are not meant to be limiting.

Figure 6:
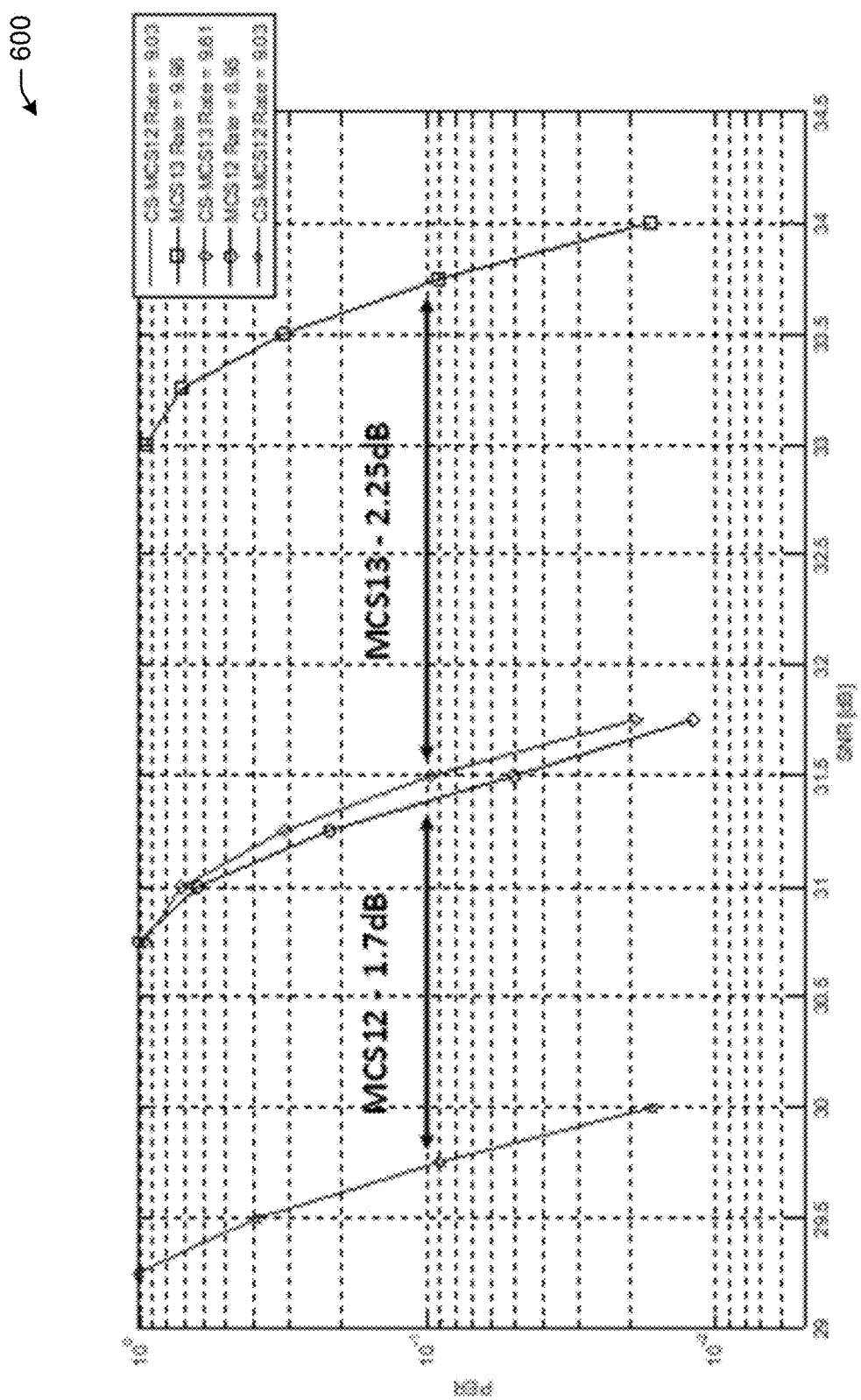
FIG. 6 depicts an illustrative schematic diagram packet error ratio (PER) results based on the enhanced constellation shaping, in accordance with one or more example embodiments of the present disclosure.

FIG. 6 depicts an illustrative schematic diagram 600 for enhanced constellation shaping, in accordance with one or more example embodiments of the present disclosure.

Referring to FIG. 6, there is shown a PER results for Method 2 (CS-MCS13).

Here we show smaller rates, however the shaping gain, considering rate differences, is also ~1.1 dB. The data rate of Method 2 is lower than Method 1 because the payload bits carried by the scrambled bits are passed through the shaping encoder unlike Method 1. This rate reduction can also be seen by comparing Equations (1) and (2) and noting the 90 bit term and the shaping rate $R_{shaping}$ term. Although the data rate of Method 2 is lower than Method 1, the SNR gain of Method 2 is higher than Method 1 i.e. 2.2 dB vs 1.1 dB. Taking the data rate difference between the two into account, the effective SNR gains of the two methods over the standard scheme, which is denoted as MC13 in FIGS. 4 and 6, are about the same i.e. 1.1 dB when achieving the same throughput as the standard scheme. It is understood that the above descriptions are for purposes of illustration and are not meant to be limiting.

Figure 7:
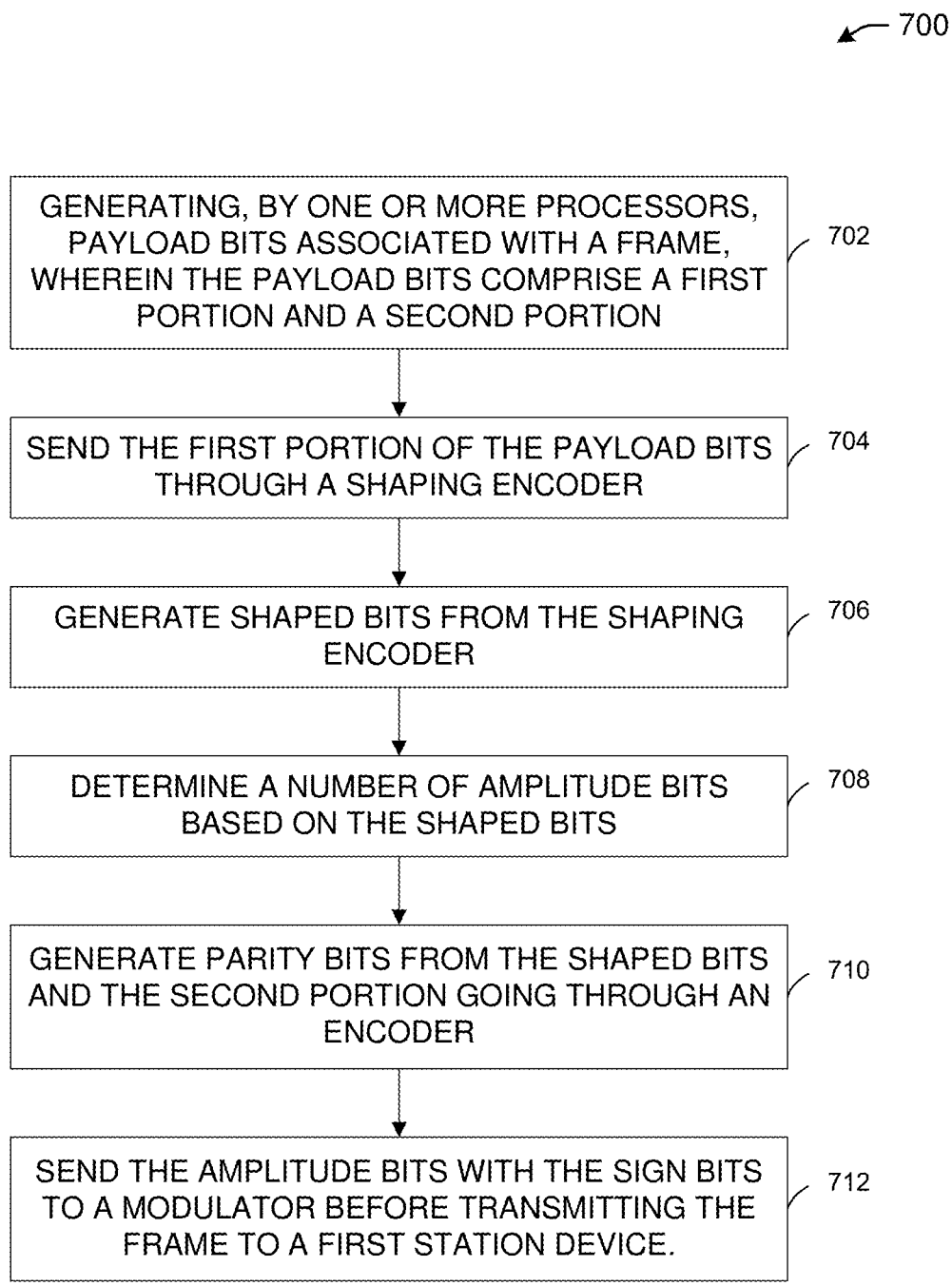
FIG. 7 illustrates a flow diagram of illustrative process for an illustrative enhanced constellation shaping system, in accordance with one or more example embodiments of the present disclosure.

FIG. 7 illustrates a flow diagram of illustrative process 700 for an enhanced constellation shaping system, in accordance with one or more example embodiments of the present disclosure.

At block 702, a device (e.g., the user device(s) 120 and/or the AP 102 of FIG. 1) may generate payload bits associated with a frame, wherein the payload bits comprise a first portion and a second portion.

At block 704, the device may send the first portion of the payload bits through a shaping encoder.

At block 706, the device may generate shaped bits from the shaping encoder.

At block 708, the device may determine a number of amplitude bits based on the shaped bits.

At block 710, the device may generate parity bits from the shaped bits and the second portion going through an encoder. The encoder is associated with a rate that is equal to a number of the payload bits divided by the payload bits added to the first subset of the parity bits. The rate is associated with a codeword size. The encoder may comprise a low-density parity-check (LDPC) encoder, linear block encoder, or trellis encoder.

At block 712, the device may select sign bits comprising the second portion and a first subset of the parity bits. The sign bits match the number of amplitude bits. The parity bits may be punctured to remove a second subset of the parity bits. At block 714, the device may send the amplitude bits with the sign bits to a modulator before transmitting the frame to a first station device.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a enhanced constellation shaping device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the enhanced constellation shaping device 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced constellation shaping device 919 may carry out or perform any of the operations and processes (e.g., process 700) described and shown above.

It is understood that the above are only a subset of what the enhanced constellation shaping device 919 may be configured to perform and that other functions included throughout this disclosure may also be performed by the enhanced constellation shaping device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
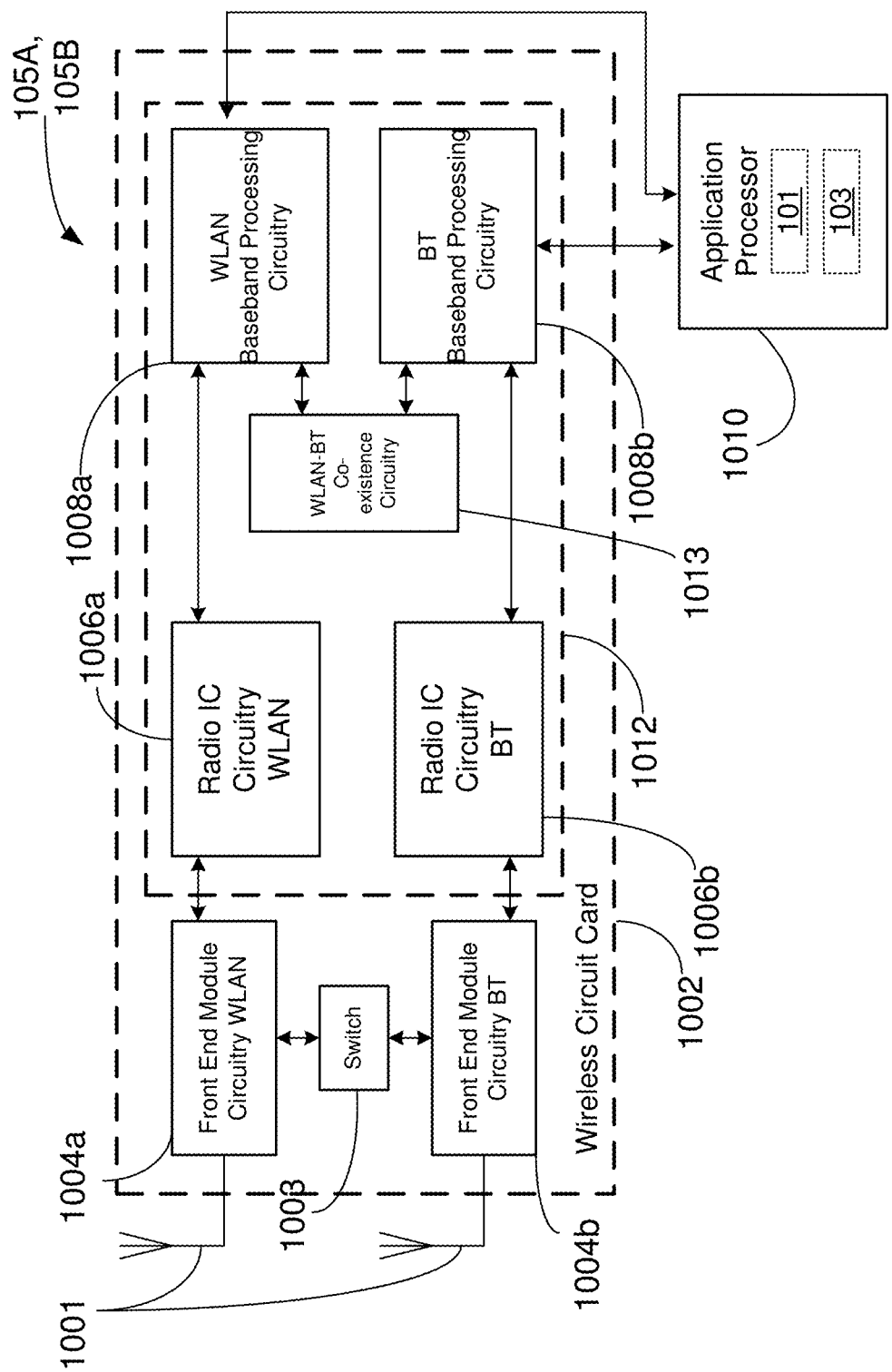
FIG. 10 is a block diagram of a radio architecture in accordance with some examples.

FIG. 10 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 1004a-

*b*, radio IC circuitry 1006*a-b* and baseband processing circuitry 1008*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004*a-b* may include a WLAN or Wi-Fi FEM circuitry 1004*a* and a Bluetooth (BT) FEM circuitry 1004*b*. The WLAN FEM circuitry 1004*a* may include a receive signal path comprising circuitry configured to operate on WLAN RF signals received from one or more antennas 1001, to amplify the received signals and to provide the amplified versions of the received signals to the WLAN radio IC circuitry 1006*a* for further processing. The BT FEM circuitry 1004*b* may include a receive signal path which may include circuitry configured to operate on BT RF signals received from one or more antennas 1001, to amplify the received signals and to provide the amplified versions of the received signals to the BT radio IC circuitry 1006*b* for further processing. FEM circuitry 1004*a* may also include a transmit signal path which may include circuitry configured to amplify WLAN signals provided by the radio IC circuitry 1006*a* for wireless transmission by one or more of the antennas 1001. In addition, FEM circuitry 1004*b* may also include a transmit signal path which may include circuitry configured to amplify BT signals provided by the radio IC circuitry 1006*b* for wireless transmission by the one or more antennas. In the embodiment of FIG. 10, although FEM 1004*a* and FEM 1004*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006*a-b* as shown may include WLAN radio IC circuitry 1006*a* and BT radio IC circuitry 1006*b*. The WLAN radio IC circuitry 1006*a* may include a receive signal path which may include circuitry to down-convert WLAN RF signals received from the FEM circuitry 1004*a* and provide baseband signals to WLAN baseband processing circuitry 1008*a*. BT radio IC circuitry 1006*b* may in turn include a receive signal path which may include circuitry to down-convert BT RF signals received from the FEM circuitry 1004*b* and provide baseband signals to BT baseband processing circuitry 1008*b*. WLAN radio IC circuitry 1006*a* may also include a transmit signal path which may include circuitry to up-convert WLAN baseband signals provided by the WLAN baseband processing circuitry 1008*a* and provide WLAN RF output signals to the FEM circuitry 1004*a* for subsequent wireless transmission by the one or more antennas 1001. BT radio IC circuitry 1006*b* may also include a transmit signal path which may include circuitry to up-convert BT baseband signals provided by the BT baseband processing circuitry 1008*b* and provide BT RF output signals to the FEM circuitry 1004*b* for subsequent wireless transmission by the one or more antennas 1001. In the embodiment of FIG. 10, although radio IC circuitries 1006*a* and 1006*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008*a-b* may include a WLAN baseband processing circuitry 1008*a* and a BT baseband processing circuitry 1008*b*. The WLAN baseband processing circuitry 1008*a* may include a memory, such as, for example, a set of RAM arrays in a Fast Fourier Transform or Inverse Fast Fourier Transform block (not shown) of the WLAN baseband processing circuitry 1008*a*. Each of the WLAN baseband circuitry 1008*a* and the BT baseband circuitry 1008*b* may further include one or more processors and control logic to process the signals received from the corresponding WLAN or BT receive signal path of the radio IC circuitry 1006*a-b*, and to also generate corresponding WLAN or BT baseband signals for the transmit signal path of the radio IC circuitry 1006*a-b*. Each of the baseband processing circuitries 1008*a* and 1008*b* may further include physical layer (PHY) and medium access control layer (MAC) circuitry, and may further interface with a device for generation and processing of the baseband signals and for controlling operations of the radio IC circuitry 1006*a-b*.

Referring still to FIG. 10, according to the shown embodiment, WLAN-BT coexistence circuitry 1013 may include logic providing an interface between the WLAN baseband circuitry 1008*a* and the BT baseband circuitry 1008*b* to enable use cases requiring WLAN and BT coexistence. In addition, a switch 1003 may be provided between the WLAN FEM circuitry 1004*a* and the BT FEM circuitry 1004*b* to allow switching between the WLAN and BT radios according to application needs. In addition, although the antennas 1001 are depicted as being respectively connected to the WLAN FEM circuitry 1004*a* and the BT FEM circuitry 1004*b*, embodiments include within their scope the sharing of one or more antennas as between the WLAN and BT FEMs, or the provision of more than one antenna connected to each of FEM 1004*a* or 1004*b*.

In some embodiments, the front-end module circuitry 1004*a-b*, the radio IC circuitry 1006*a-b*, and baseband processing circuitry 1008*a-b* may be provided on a single radio card, such as wireless radio card 1002. In some other embodiments, the one or more antennas 1001, the FEM circuitry 1004*a-b* and the radio IC circuitry 1006*a-b* may be provided on a single radio card. In some other embodiments, the radio IC circuitry 1006*a-b* and the baseband processing circuitry 1008*a-b* may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1008b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies.

Figure 11:
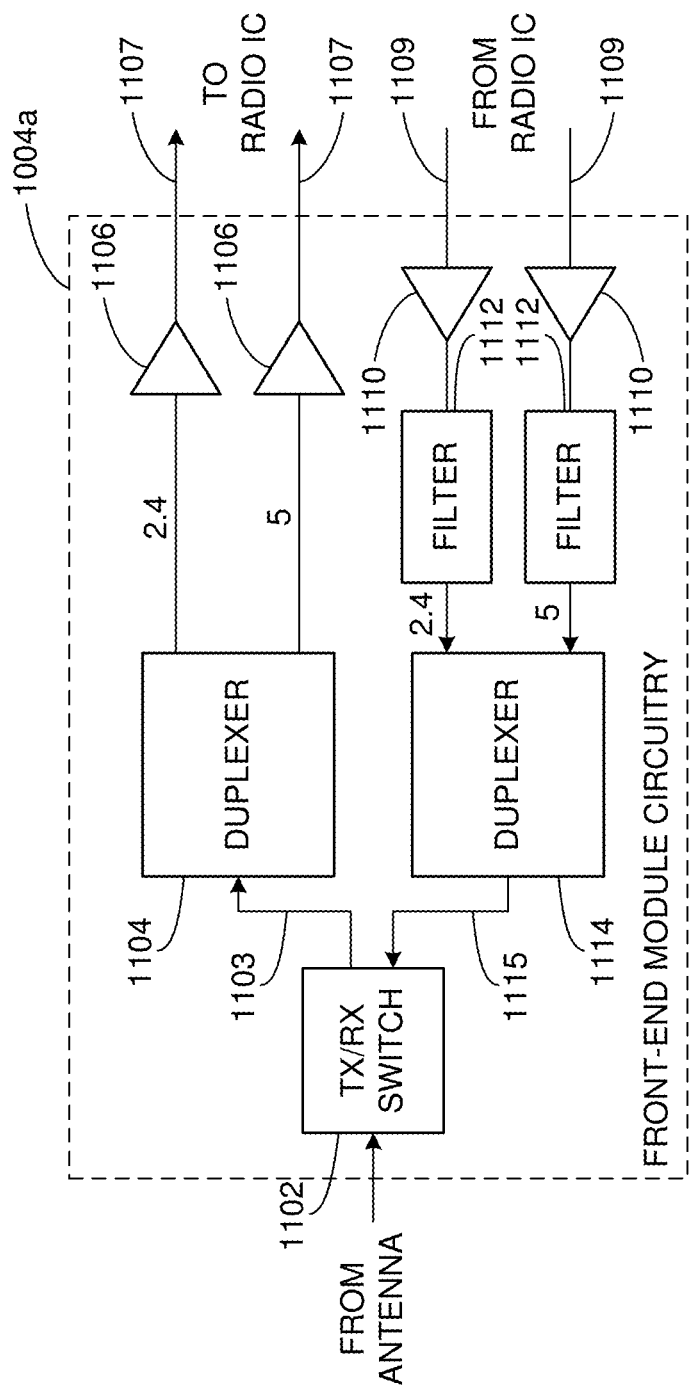
FIG. 11 illustrates an example front-end module circuitry for use in the radio architecture of FIG. 10, in accordance with one or more example embodiments of the present disclosure.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 5 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004a as the one used for WLAN communications.

Figure 12:
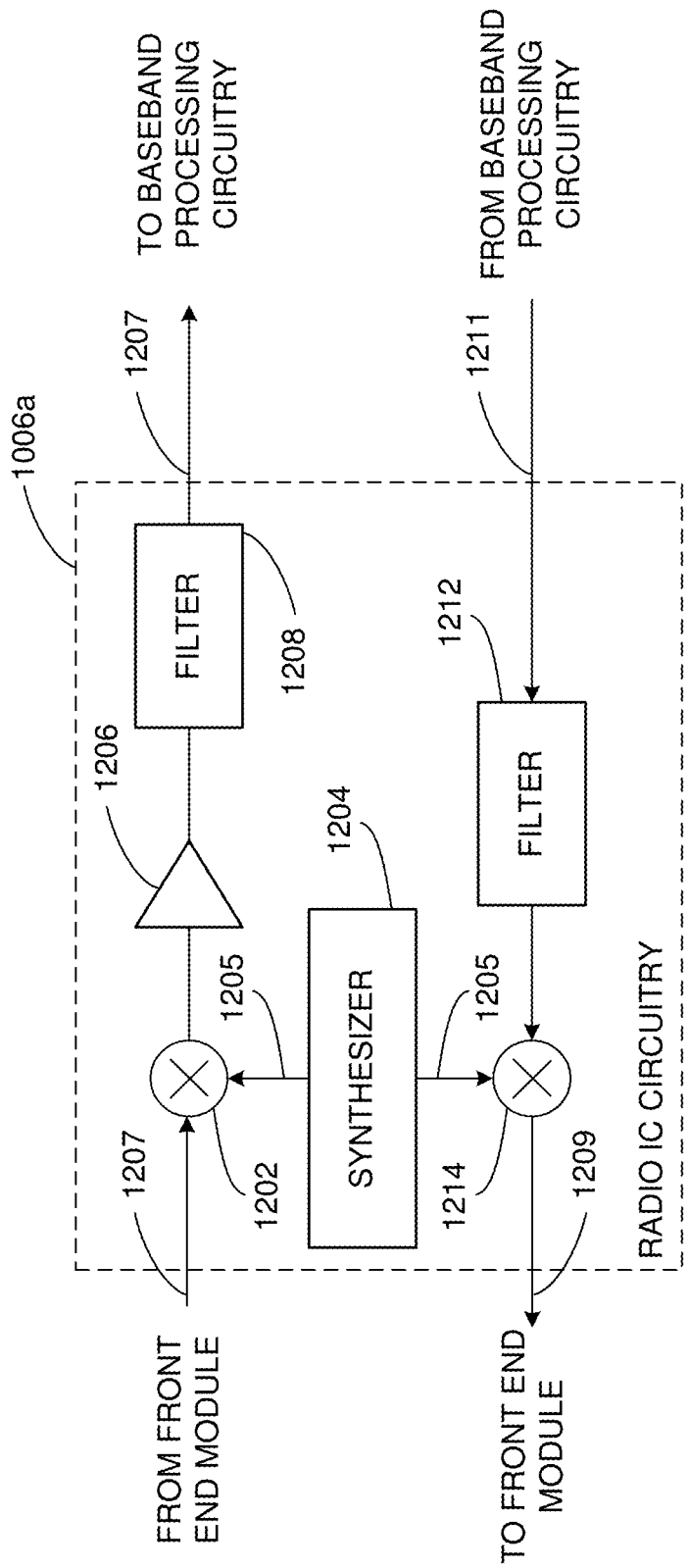
FIG. 12 illustrates an example radio IC circuitry for use in the radio architecture of FIG. 10, in accordance with one or more example embodiments of the present disclosure.

FIG. 12 illustrates radio IC circuitry 1006a in accordance with some embodiments. The radio IC circuitry 1006a is one example of circuitry that may be suitable for use as the WLAN or BT radio IC circuitry 1006a/1006b (FIG. 10), although other circuitry configurations may also be suitable. Alternatively, the example of FIG. 12 may be described in conjunction with the example BT radio IC circuitry 1006b.

In some embodiments, the radio IC circuitry 1006a may include a receive signal path and a transmit signal path. The receive signal path of the radio IC circuitry 1006a may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, up-conversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a-b (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008a-b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004*a-b*. The baseband signals 1211 may be provided by the baseband processing circuitry 1008*a-b* and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or up-conversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct up-conversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008*a-b* (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
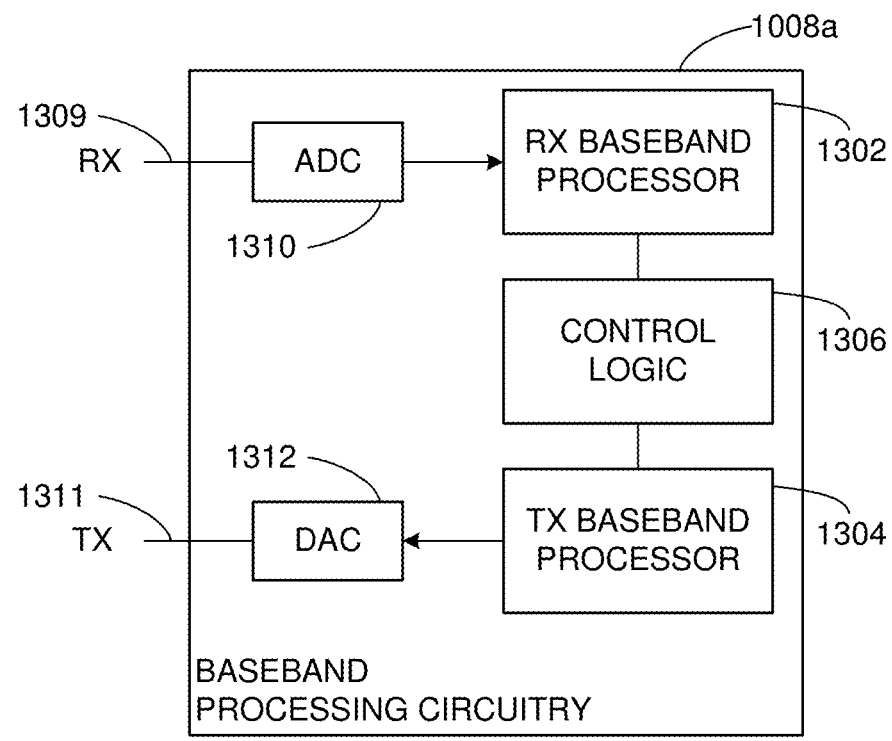
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008*a* in accordance with some embodiments. The baseband processing circuitry 1008*a* is one example of circuitry that may be suitable for use as the baseband processing circuitry 1008*a* (FIG. 10), although other circuitry configurations may also be suitable. Alternatively, the example of FIG. 12 may be used to implement the example BT baseband processing circuitry 1008*b* of FIG. 10.

The baseband processing circuitry 1008*a* may include a receive baseband processor (RX BBP) 1302 for processing receive baseband signals 1209 provided by the radio IC circuitry 1006*a-b* (FIG. 10) and a transmit baseband processor (TX BBP) 1304 for generating transmit baseband signals 1211 for the radio IC circuitry 1006*a-b*. The baseband processing circuitry 1008*a* may also include control logic 1306 for coordinating the operations of the baseband processing circuitry 1008*a*.

In some embodiments (e.g., when analog baseband signals are exchanged between the baseband processing circuitry 1008*a-b* and the radio IC circuitry 1006*a-b*), the baseband processing circuitry 1008*a* may include ADC 1310 to convert analog baseband signals 1309 received from the radio IC circuitry 1006*a-b* to digital baseband signals for processing by the RX BBP 1302. In these embodiments, the baseband processing circuitry 1008*a* may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate payload bits associated with a frame, wherein the payload bits comprise a first portion and a second portion; send the first portion of the payload bits through a shaping encoder; generate shaped bits from the shaping encoder; determine a number of amplitude bits based on the shaped bits; generate parity bits from the shaped bits and the second portion going through an encoder; select sign bits comprising the second portion and a first subset of the parity bits; and send the amplitude bits with the sign bits to a modulator before transmitting the frame to a first station device.

Example 2 may include the device of example 1 and/or some other example herein, wherein the sign bits match the number of amplitude bits.

Example 3 may include the device of example 1 and/or some other example herein, wherein the encoder may be associated with a rate that may be equal to a number of the payload bits divided by the payload bits added to the first subset of the parity bits.

Example 4 may include the device of example 3 and/or some other example herein, wherein the rate may be associated with a codeword size.

Example 5 may include the device of example 1 and/or some other example herein, wherein the encoder comprises a low-density parity-check (LDPC) encoder, linear block encoder, or trellis encoder.

Example 6 may include the device of example 1 and/or some other example herein, wherein a size of the second portion may be based on a number of the amplitude bits.

Example 7 may include the device of example 1 and/or some other example herein, wherein the parity bits are punctured to remove a second subset of the parity bits.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the frame.

Example 10 may include a non-transitory computer-readable medium storing computer-executable instructions which when executed by one or more processors result in performing operations comprising: generating payload bits associated with a frame, wherein the payload bits comprise a first portion and a second portion; sending the payload bits through a shaping encoder to generate shaped bits; sending a first portion of the shaped bits through a scrambler to generate scrambled shaped bits, while a second portion of the shaped bits remain as unscrambled bits; combining the scrambled shaped bits with the unscrambled bits as an input to an encoder to generate parity bits; selecting sign bits comprising the scrambled shaped bits and a first subset of the parity bits; determining a number of amplitude bits based on the unscrambled shaped bits; sending the amplitude bits with the sign bits to a modulator before transmitting the frame to a first station device.

Example 11 may include the non-transitory computer-readable medium of example 10 and/or some other example herein, wherein passing through a scrambler to use a mask to convert bits to an equiprobable sequence of bits.

Example 12 may include the non-transitory computer-readable medium of example 11 and/or some other example herein, wherein the mask may be communicated to the first station device using an indication.

Example 13 may include the non-transitory computer-readable medium of example 12 and/or some other example herein, wherein the indication of the selected mask indicates to the first station device how the payload bits have been converted, which allows the first station device to use the selected mask to regenerate the payload bits.

Example 14 may include the non-transitory computer-readable medium of example 10 and/or some other example herein, wherein the parity bits are punctured to remove a second subset of the parity bits.

Example 15 may include the non-transitory computer-readable medium of example 10 and/or some other example herein, wherein the shaped bits are generated using a lookup table.

Example 16 may include the non-transitory computer-readable medium of example 10 and/or some other example herein, wherein the shaped bits are output at a fixed length.

Example 17 may include a method comprising: generating, by one or more processors, payload bits associated with a frame, wherein the payload bits comprise a first portion and a second portion; sending the first portion of the payload bits through a shaping encoder; generating shaped bits from the shaping encoder; determining a number of amplitude bits based on the shaped bits; generating parity bits from the shaped bits and the second portion going through an encoder; selecting sign bits comprising the second portion and a first subset of the parity bits; and sending the amplitude bits with the sign bits to a modulator before transmitting the frame to a first station device.

Example 18 may include the method of example 17 and/or some other example herein, wherein the sign bits match the number of amplitude bits.

Example 19 may include the method of example 17 and/or some other example herein, wherein the encoder may be associated with a rate that may be equal to a number of the payload bits divided by the payload bits added to the first subset of the parity bits.

Example 20 may include the method of example 19 and/or some other example herein, wherein the rate may be associated with a codeword size.

Example 21 may include the method of example 17 and/or some other example herein, wherein the encoder comprises a low-density parity-check (LDPC) encoder, linear block encoder, or trellis encoder.

Example 22 may include the method of example 17 and/or some other example herein, wherein a size of the second portion may be based on a number of the amplitude bits.

Example 23 may include the method of example 17 and/or some other example herein, wherein the parity bits are punctured to remove a second subset of the parity bits.

Example 24 may include an apparatus comprising means for: generating payload bits associated with a frame, wherein the payload bits comprise a first portion and a second portion; sending the first portion of the payload bits through a shaping encoder; generating shaped bits from the shaping encoder; determining a number of amplitude bits based on the shaped bits; generating parity bits from the shaped bits and the second portion going through an encoder; selecting sign bits comprising the second portion and a first subset of the parity bits; and sending the amplitude bits with the sign bits to a modulator before transmitting the frame to a first station device.

Example 25 may include the apparatus of example 24 and/or some other example herein, wherein the sign bits match the number of amplitude bits.

Example 26 may include the apparatus of example 24 and/or some other example herein, wherein the encoder may be associated with a rate that may be equal to a number of the payload bits divided by the payload bits added to the first subset of the parity bits.

Example 27 may include the apparatus of example 26 and/or some other example herein, wherein the rate may be associated with a codeword size.

Example 28 may include the apparatus of example 24 and/or some other example herein, wherein the encoder comprises a low-density parity-check (LDPC) encoder, linear block encoder, or trellis encoder.

Example 29 may include the apparatus of example 24 and/or some other example herein, wherein a size of the second portion may be based on a number of the amplitude bits.

Example 30 may include the apparatus of example 24 and/or some other example herein, wherein the parity bits are punctured to remove a second subset of the parity bits.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   generate payload bits associated with a frame, wherein the payload bits comprise a first portion and a second portion;
   send the first portion of the payload bits through a shaping encoder;
   generate shaped bits from the shaping encoder;
   determine a number of amplitude bits based on the shaped bits;
   generate parity bits from the shaped bits and the second portion going through an low-density parity-check (LDPC) encoder, wherein the LDPC encoder is associated with an LDPC rate that is equal to a number of the payload bits divided by the payload bits added to the first subset of the parity bits;
   select sign bits comprising the second portion and a first subset of the parity bits; and
   send the amplitude bits with the sign bits to a modulator before transmitting the frame to a first station device.

2. The device of claim 1, wherein the sign bits match the number of amplitude bits.

3. The device of claim 1, wherein the LDPC rate is associated with LDPC codeword size.

4. The device of claim 1, wherein a size of the second portion is based on a number of the amplitude bits.

5. The device of claim 1, wherein the parity bits are punctured to remove a second subset of the parity bits.

6. The device of claim 5, wherein puncturing the parity bits to remove the second subset of the parity bits results in a higher data rate.

7. The device of claim 1, further comprising a transceiver configured to transmit and receive wireless signals.

8. The device of claim 7, further comprising an antenna coupled to the transceiver to cause to send the frame.

9. A non-transitory computer-readable medium storing computer-executable instructions which when executed by one or more processors result in performing operations comprising:
   generating payload bits associated with a frame, wherein the payload bits comprise a first portion and a second portion;
   sending the payload bits through a shaping encoder to generate shaped bits;
   sending a first portion of the shaped bits through a scrambler to generate scrambled shaped bits, while a second portion of the shaped bits remain as unscrambled bits;
   combining the scrambled shaped bits with the unscrambled bits as an input to an LDPC encoder to generate parity bits;
   selecting sign bits comprising the scrambled shaped bits and a first subset of the parity bits;
   determining a number of amplitude bits based on the unscrambled shaped bits; and
   sending the amplitude bits with the sign bits to a modulator before transmitting the frame to a first station device.

10. The non-transitory computer-readable medium of claim 9, wherein passing through a scrambler to use a mask to convert the bits to an equiprobable sequence of bits.

11. The non-transitory computer-readable medium of claim 10, wherein the mask is communicated to the first station device using an indication.

12. The non-transitory computer-readable medium of claim 11, wherein the indication of the selected mask indicates to the first station device how the payload bits have been converted, which allows the first station device to use the selected mask to regenerate the payload bits.

13. The non-transitory computer-readable medium of claim 9, wherein the parity bits are punctured to remove a second subset of the parity bits.

14. The non-transitory computer-readable medium of claim 9, wherein the shaped bits are generated using a lookup table.

15. The non-transitory computer-readable medium of claim 9, wherein the shaped bits are output at a fixed length.

16. A method comprising:
   generating, by one or more processors, payload bits associated with a frame, wherein the payload bits comprise a first portion and a second portion;
   sending the first portion of the payload bits through a shaping encoder;
   generating shaped bits from the shaping encoder;
   determining a number of amplitude bits based on the shaped bits;
   generating parity bits from the shaped bits and the second portion going through an low-density parity-check (LDPC) encoder, wherein the LDPC encoder is associated with an LDPC rate that is equal to a number of the payload bits divided by the payload bits added to the first subset of the parity bits;
   selecting sign bits comprising the second portion and a first subset of the parity bits; and
   sending the amplitude bits with the sign bits to a modulator before transmitting the frame to a first station device.

17. The method of claim 16, wherein the sign bits match the number of amplitude bits.

18. The method of claim 16, wherein the LDPC rate is associated with LDPC codeword size.

* * * * *